United States Patent Office 3,360,387
Patented Dec. 26, 1967

3,360,387
MAGNESIA CHROME ORE REFRACTORY
Ralph C. Padfield, Bethlehem, Pa., assignor to Bethlehem Steel Corporation, a corporation of Delaware
No Drawing. Filed Aug. 9, 1966, Ser. No. 571,360
5 Claims. (Cl. 106—59)

ABSTRACT OF THE DISCLOSURE

A method of manufacturing silicate bonded basic refractory bricks suitable for lining metallurgical furnaces which method includes preparing a refractory mix containing about 40% to about 60% magnesia and about 60% to about 40% chrome ore, said mix also containing 2.5% to 8.0% silica, not more than 20.0% $Al_2O_3$ and not more than 15% iron oxide, and having a lime to silica ratio of not more than 0.26. The mix is formed into the required shapes which when fired at sufficiently high temperatures for a sufficient length of time and cooled at a rapid rate from the firing temperature will be bonded by interstitial solid solution silicates substantially all of which are forsterite.

---

This invention in general relates to a composition of a refractory material and method of making the same and particularly to basic refractory magnesia-chrome ore bricks bonded by solid solution forsterite and a method of making the same. This application is a continuation-in-part of my application Serial No. 399,890 filed September 28, 1964, now abandoned.

Modern basic refractory bricks must have a high degree of resistance to failure at the higher temperatures prevalent in modern steelmaking furnaces. Several basic refractory bricks of the magnesia-chrome ore type are made by direct bonding together the grains of magnesia and those of magnesia and chrome ore spinels by firing these bricks at elevated temperatures. The primary components of bricks so fired are magnesia containing absorbed iron oxide and chrome-ore spinels. The secondary components are various silicates, for example, forsterite (2 $MgO \cdot SiO_2$), monticellite ($MgO \cdot CaO \cdot SiO_2$) and merwinite (3 $CaO \cdot MgO \cdot SiO_2$) and the spinel, magneso-ferrite, which act as bonds for the particles of crystallized magnesia. The failure of this type of bricks is due, usually, to failure of the bond between the grains although failure of the grains can also occur. In conventional manufacture when the bricks are fired to the softening temperature of any of the components or to the melting points of the lowest melting silicate constituents, monticellite and merwinite, a bond of varying solid solution silicate composition is formed, which is plastic above these low temperatures. The bond between the grains thus formed is weak and melts or softens to the point where it loses its strength under load at relatively low temperatures.

Then, too, these bricks are porous and susceptible to attack by the environment, for example, slags, atmospheres, metals, which are present in the furnace. As a result interstitial penetration by the several components in the furnace environment results in spalling, iron oxide expansion and lowered resistance to thermal shock.

It is, therefore, the primary purpose of this invention to produce magnesia-chrome ore refractory bricks which will exhibit increased strength at the high temperatures prevalent in steelmaking furnaces.

It is another object of this invention to produce magnesia-chrome ore refractory bricks which will have high temperature melting interstitial bonds resulting in improved load bearing characteristics at high temperatures.

It is still another object of this invention to produce magnesia-chrome ore refractory bricks which are less porous, more resistant to thermal shock and more resistant to spalling and iron oxide expansion than heretofore obtainable.

Broadly my invention comprises adding chrome ore to magnesia to form a basic refractory mix, said chrome ore containing low percentages by weight of lime and silica to effect a very low lime to silica weight ratio in the resultant basic refractory mix, forming bricks therefrom, firing the formed magnesia-chrome ore bricks at high temperatures for a sufficient length of time, and rapidly cooling the fired brick so as to retain high melting solid solution forsterite at the expense of the lower melting solid solutions, monticellite and merwinite.

In order to improve the hot strength at load of basic refractory bricks of the magnesia-chrome ore type, it is necessary that the bonds formed between the grain in the bricks must be resistant to the high temperatures prevalent in metallurgical furnaces. These types of bricks contain impurities, particularly lime and silica which combine with the magnesia to form low melting solid solution silicate bonds when the bricks are fired at the usual temperatures of 2700° F. to 2900° F. It is therefore necessary to control the lime and silica contents in the bricks so that the higher melting solid solution forsteritic bonds are formed in the finished fired bricks. I have found that a magnesia-chrome ore refractory mix including from 40% to 60% magnesia and 60% to 40% chrome ore and which has a silica content by weight of not less than 2.5% and not more than 8.00% and preferably about 4.00% and having a lime to silica weight ratio of not more than 0.26 and preferably not more than 0.10, can be formed into bricks in which, when fired at not less than 3050° F. for not less than 2 hours and preferably six hours, and cooled after firing at a substantially rapid rate, not less than about 20° F. per minute, the solid solution high melting interstitial silicate bonding agent, forsterite, is formed at the expense of the low melting silicate bonding agents, monticellite and merwinite.

Refractory grade chrome ores normally contain iron oxide in the range of 9% to 23%, alumina in the range of 10% to 32% by weight, lime in the range of 0.10% to 1.5% by weight and silica within the range of 1.00% to 10.00% by weight as impurities. In basic refractory bricks containing such chrome ore mixed with magnesia, it has been found that the formation of forsterite solid solution is not adversely affected if the iron oxide content by weight is not more than about 15% and the alumina content by weight is not more than about 20%.

In specific examples of the invention, several basic refractory mixes having the following chemical compositions were tested:

|  | Test 1 | Test 2 | Test 3 | Test 4 |
|---|---|---|---|---|
| MgO Class (percent) | 40 | 50 | 60 | 60 |
| CaO/SiO$_2$ Ratio | 0.16 | 0.09 | 0.24 | 0.54 |
| CaO | 0.60 | 0.70 | 1.30 | 1.40 |
| MgO | 40.50 | 50.20 | 62.30 | 63.70 |
| SiO$_2$ | 3.80 | 7.80 | 5.40 | 2.60 |
| Al$_2$O$_3$ | 19.50 | 15.90 | 12.50 | 11.60 |
| Fe$_2$O$_3$ | 9.30 | 6.50 | 5.50 | 5.60 |
| Cr$_2$O$_3$ | 22.00 | 17.40 | 13.00 | 13.10 |
| Ignition Loss | 3.00 | 2.20 |  | 3.00 |

Bricks formed from these mixes were fired at 3050° F. and also within the temperature range of 2900° F. to 3200° F. at 100° F. increments, and were held at these firing temperatures for 2 hours. After firing, the bricks were cooled at 20° F. per minute to 1600° F. From this point cooling took place at approximately 120° F. per hour until the furnace reached temperature of 200° F., when the bricks were removed from the furnace.

The initial silicate bonds which formed at 2900° F. in the bricks contained only traces of forsterite and consequently the bricks had low hot strength. As the firing temperature was increased, the amount of forsterite increased, and the hot strength increased. The formation of forsterite bonds, and corresponding increases in hot strength, were obtained to a lesser degree in the 60% MgO bricks of Test 4. Equilibrium was attained in the silicate bonds of the test bricks fired above 3050° F. Further, the phase relationships existing at the solidus temperature also exist at room temperature, because the bricks were cooled rapidly, that is, at least 1200° F. per hour to the aforementioned 1600° F. after firing. This rapid cooling prevented the decomposition of forsterite-monticellite solid solutions. The test bricks having compositions with lime/silica weight ratios of less than 0.26, Tests 1, 2 and 3, were found to be bonded by substantially all refractory forsterite solid solution bonds. On the other hand bricks from test mix 4 which had a lime/silica ratio of 0.54 showed some forsterite formation but also contained monticellite silicate bonds.

The hot strength was determined by the failure temperature under transverse load test which comprised heating the fired bricks to 2100° F.—soaking 15 minutes—applying a 25 p.s.i. load and raising the temperature 100° F. per hour until the bricks failed. No failure was observed in bricks formed from test mixes 1, 2, and 3 at 2900° F. The bricks formed from test mix 4 failed at 2836° F. Marked increases in hot strength were obtained in test bricks 1, 2, and 3 by harder firing. Test bricks made from refractory mix Test 3, containing silica of 5.4% by weight, did not exhibit as great an increase as did the bricks having the lower silica contents, Tests 1 and 2.

The results of the study of lime/silica weight ratios given indicate that hot strength is related inversely to the lime/silica weight ratio. The bricks having a lime/silica weight ratio less than 0.10 formed from the refractory mix of Test 2 did not fail at 2900° F. under a load of 50 p.s.i., whereas the bricks with higher lime/silica ratios failed when this higher 50 p.s.i. load was applied at 2900° F.

Sawed surfaces of the bricks had a rough texture due to the coarse particle sizing of the chrome ore. Discoloration of the periclase grains, resulting from the migration of iron ions was observed in the bricks fired at high temperatures. The color was deeper and more uniformly distributed with higher temperature.

In specimens fired at 2900° F. the silicate appeared gray in color and was poorly oriented, cryptocrystalline, or amorphous. With increasing temperature, the silica became more brilliantly colored by strong birefringence indicating that better crystallization took place, or that more magnesia had entered the structure to form forsterite. The bricks of Tests 1, 2 and 3 showed good forsterite development at 3100° F. Increases in firing temperatures up to 3200° F. increased the dispersion of the silicate throughout the matrix and thereby increased the bond.

On the basis of the mineralogical examination and the physical data, it is concluded that a firing temperature of 3050° F. is sufficient to form good solid solution forsterite bonding provided ample soak time of at least 2 hours and preferably 6 hours, is allowed.

I claim:
1. A method of producing magnesia-chrome ore basic refractory bricks having high hot strength and good resistance to slag comprising:
  (a) forming a basic refractory mix of 40% to 60% magnesia by weight and 60% to 40% chrome ore by weight, said mix containing from about 2.5% to about 8.00% silica by weight, lime not more than 15% iron oxide by weight, not more than 20.0% alumina by weight, the lime to silica weight ratio being not more than 0.26,
  (b) forming the mix into basic refractory bricks,
  (c) firing the bricks at a temperature of not less than 3050° F. for a time sufficient to form interstitial bonds substantially all of which are solid solution forsterite, and
  (d) cooling the bricks at a rate sufficient to prevent the formation of low melting interstitial silicate bonds.

2. A method as claimed in claim 1 in which the cooling rate of step (d) is not less than 20° F. per minute to below 1600° F.

3. A method as claimed in claim 1 in which the lime to silica weight ratio is not more than 0.10.

4. A basic refractory brick of the magnesia chrome ore type consisting essentially of about 40% to about 60% by weight magnesia, about 60% to about 40% chrome ore by weight, said brick containing from about 2.5% to about 8.00% by weight silica, lime, not more than 15% by weight iron oxide, not more than 20.0% alumina, the lime to silica weight ratio being not more than 0.26, the basic refractory brick being bonded by substantially all solid solution forsterite.

5. A basic refractory brick as claimed in claim 4 in which the lime to silica weight ratio is not more than 0.10.

References Cited

FOREIGN PATENTS 873,765    7/1961    Great Britain.

TOBIAS E. LEVOW, *Primary Examiner.*

HELEN M. McCARTHY, JAMES E. POER, *Examiners.*

UNITED STATES PATENT OFFICE
CERTIFICATE OF CORRECTION

Patent No. 3,360,387                          December 26, 1967

Ralph C. Padfield

It is hereby certified that error appears in the above numbered patent requiring correction and that the said Letters Patent should read as corrected below.

Column 4, line 17, after "lime" insert a comma.

Signed and sealed this 18th day of February 1969.

(SEAL)
Attest:

Edward M. Fletcher, Jr.                          EDWARD J. BRENNER
Attesting Officer                               Commissioner of Patents